(12) United States Patent
Shealy

(10) Patent No.: US 11,692,510 B2
(45) Date of Patent: Jul. 4, 2023

(54) PLUNGER SEAL ASSEMBLY AND SEALING METHOD

(71) Applicant: General Electric Company, Schenectady, NY (US)

(72) Inventor: James Shealy, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 17/407,439

(22) Filed: Aug. 20, 2021

(65) Prior Publication Data

US 2023/0054950 A1    Feb. 23, 2023

(51) Int. Cl.
*F02K 1/80*    (2006.01)
*F01D 25/30*    (2006.01)
*F01D 11/00*    (2006.01)

(52) U.S. Cl.
CPC ............ *F02K 1/805* (2013.01); *F01D 11/005* (2013.01); *F01D 25/30* (2013.01); *F05D 2240/55* (2013.01)

(58) Field of Classification Search
CPC ... F02K 1/00; F02K 1/80; F02K 1/805; F01D 11/00; F01D 11/005; F01D 11/006; F01D 11/008; F01D 25/00; F01D 25/30; F01D 25/305; F05D 2240/00; F05D 2240/55; F05D 2240/57; F05D 2240/58; F05D 2240/59
USPC ...................................................... 277/345
See application file for complete search history.

(56) References Cited

U.S. PATENT DOCUMENTS

| | | | |
|---|---|---|---|
| 3,121,995 A | 2/1964 | Albani | |
| 3,167,206 A | 1/1965 | Nelson | |
| 3,422,981 A | 1/1969 | Obrien | |
| 4,575,006 A | 3/1986 | Madden | |
| 4,575,099 A | 3/1986 | Nash | |
| 4,739,932 A | 4/1988 | Szuminski | |
| 4,815,276 A | 3/1989 | Hansel | |
| 4,917,302 A | 4/1990 | Steinetz | |
| 5,115,979 A * | 5/1992 | Ellerhorst | F02K 1/805 239/127.3 |

(Continued)

FOREIGN PATENT DOCUMENTS

| | | |
|---|---|---|
| DE | 3026245 | 11/1997 |
| EP | 1491931 | 12/2004 |

(Continued)

OTHER PUBLICATIONS

USPTO; U.S. Appl. No. 17/567,385; Non-Final Office Action dated Mar. 8, 2023; (pp. 9).

(Continued)

*Primary Examiner* — Nathan Cumar
(74) *Attorney, Agent, or Firm* — Fitch, Even, Tabin & Flannery LLP

(57) ABSTRACT

In some embodiments, apparatuses are provided herein useful to sealing a gap between a movable flap and stationary structure, such as a gap between a gas turbine engine nozzle flap and sidewall. An apparatus for sealing such a gap may be a plunger seal which may include a plurality of plunger segments connected together using at least one flexure. When positioned in the gap, the flexures within the plunger segments pivot allowing rotation of each of the plurality of plunger segments about their respective pivot point, such that the plunger assembly seals and contours against the movable surface.

18 Claims, 12 Drawing Sheets

(56) References Cited

U.S. PATENT DOCUMENTS

| | | |
|---|---|---|
| 5,143,292 A | 9/1992 | Corsmeier |
| 5,288,020 A | 2/1994 | Pirker |
| 5,323,965 A | 6/1994 | Froemming |
| 5,417,441 A * | 5/1995 | Hill ..................... F02K 1/805 |
| | | 239/265.11 |
| 5,522,546 A | 6/1996 | Jarvis |
| 5,676,312 A | 10/1997 | Lapergue |
| 6,702,300 B1 | 3/2004 | Steinetz |
| 7,775,048 B2 | 8/2010 | Grammel, Jr. |
| 9,016,695 B2 | 4/2015 | Treat |
| 9,103,298 B2 | 8/2015 | Gormley |
| 9,341,120 B2 | 5/2016 | Barry, Jr. |
| 9,810,085 B2 | 11/2017 | McMahon |
| 10,513,939 B2 | 12/2019 | Roberge |
| 10,550,707 B2 | 2/2020 | Boeck |
| 10,969,015 B2 | 4/2021 | George |
| 11,047,481 B2 | 6/2021 | Bidkar |
| 2008/0000236 A1 | 1/2008 | Grammel |
| 2013/0033005 A1 | 2/2013 | Treat |
| 2016/0076391 A1* | 3/2016 | Guinn ..................... F02C 7/28 |
| | | 277/591 |
| 2017/0146130 A1 | 5/2017 | Yanagisawa |
| 2018/0149032 A1* | 5/2018 | Boeck ................. F01D 11/005 |
| 2018/0202659 A1 | 7/2018 | Stieg |
| 2018/0328313 A1 | 11/2018 | Senofonte |
| 2018/0335143 A1 | 11/2018 | George |
| 2019/0170007 A1 | 6/2019 | Davis |
| 2019/0203842 A1* | 7/2019 | Bidkar ................. F01D 11/003 |
| 2022/0042423 A1 | 2/2022 | Hopper |
| 2022/0403798 A1 | 12/2022 | Shealy |
| 2022/0412266 A1 | 12/2022 | Shealy |
| 2022/0412464 A1 | 12/2022 | Shealy |

FOREIGN PATENT DOCUMENTS

| | | |
|---|---|---|
| EP | 2511481 | 10/2012 |
| EP | 3744964 | 12/2020 |
| EP | 4086436 | 11/2022 |
| KR | 100440720 | 3/2003 |

OTHER PUBLICATIONS

USPTO; U.S. Appl. No. 17/352,605, Notice of Allowance and Fees Due (PTOL-85) dated Jan. 18, 2023; (pp. 1-9).

USPTO; U.S. Appl. No. 17/567,385, filed Jan. 3, 2022, entitled "Plunger Seal Apparatus and Sealing Method".

USPTO; U.S. Appl. No. 17/578,717, filed Jan. 19, 2022, entitled "Seal Assembly and Sealing Method,".

USPTO; U.S. Appl. No. 17/578,717; Notice of Allowance dated Dec. 12, 2022; (pp. 12).

USPTO; U.S. Appl. No. 17/578,717; Restriction Requirement dated Sep. 20, 2022; (pp. 7).

USPTO; U.S. Appl. No. 17/361,479; Notice of Allowance and Fees Due (PTOL-85) dated Feb. 6, 2023; (pp. 1-2).

USPTO; U.S. Appl. No. 17/362,391; Non-Final Rejection dated Jan. 31, 2023; (pp. 1-8).

USPTO; U.S. Appl. No. 17/352,605; Notice of Allowance and Fees Due (PTOL-85) dated May 9, 2023; (pp. 1-9).

USPTO; U.S. Appl. No. 17/362,391; Notice of Allowance and Fees Due (PTOL-85) dated May 11, 2023; (pp. 1-9).

* cited by examiner

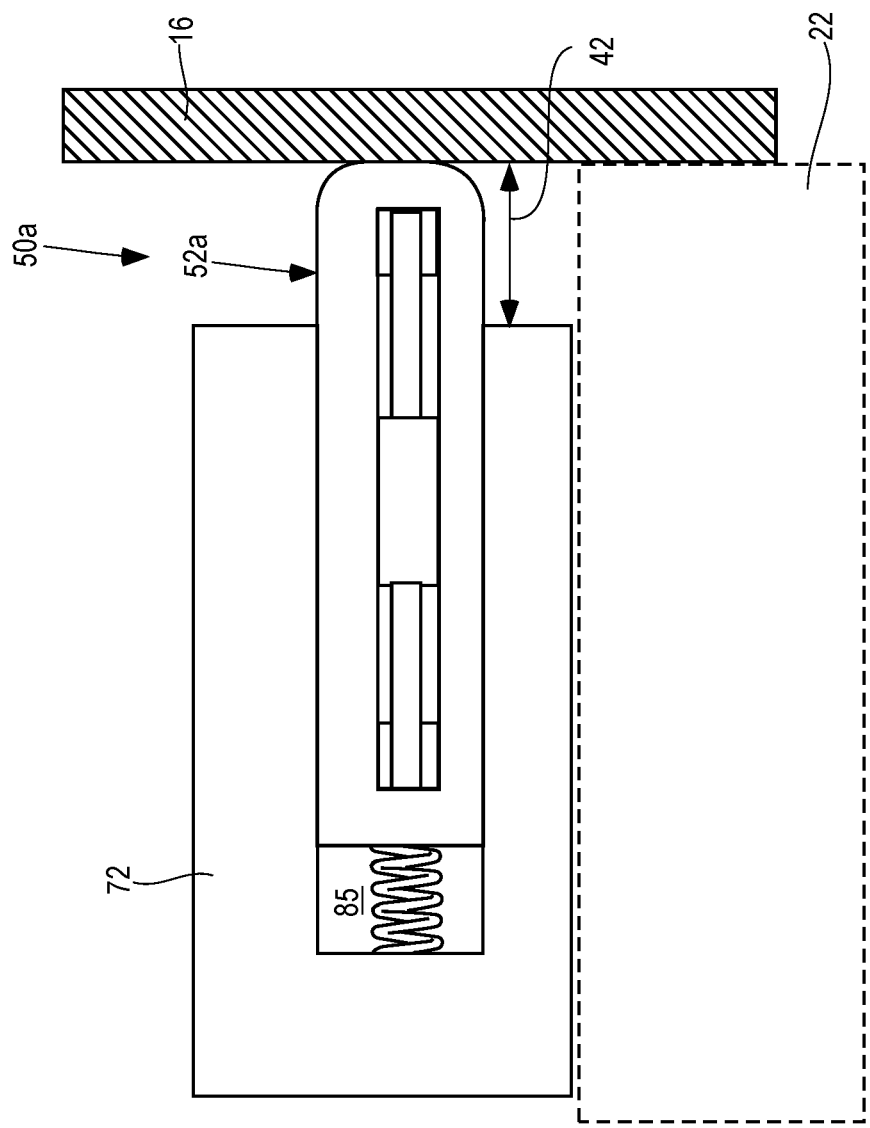

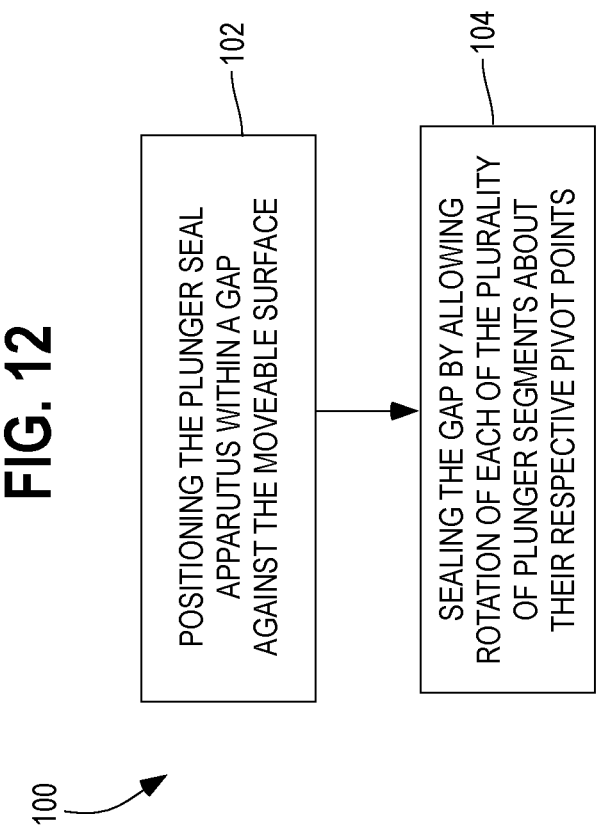

PLUNGER SEAL ASSEMBLY AND SEALING METHOD

GOVERNMENT INTERESTS

This invention was made with United States Government support. The Government has certain rights to this invention.

TECHNICAL FIELD

This technical field relates generally to seals for sealing a gap between a stationary structure and contoured wall or movable surface component. More specifically, the invention relates to plunger seal assemblies and methods for preventing air leakage in applications including, but not limited to, gas turbine engine exhaust nozzles.

BACKGROUND

A gas turbine engine, such as a gas turbine engine for powering an aircraft, may include an exhaust nozzle downstream of the turbine. The exhaust nozzle may include a movable flap positioned between the nozzle sidewalls. The flap may be actuated via a series of linkages to control a two-dimensional area within the nozzle to direct and accelerate the flow of core air from the engine for the purpose of thrust.

Gaps between the flap and the nozzle sidewalls may create channels through which core air may flow, for example, due to a pressure gradient between the nozzle core and ambient environment surrounding the nozzle. Leakage of core air from the nozzle core to the ambient environment may reduce the thrust and efficiency of the engine.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which:

FIG. 11 is a perspective view of an actuated plunger seal assembly, in accordance with some embodiments.

FIG. 12 is a flow chart diagram of a method of sealing a gap against a movable surface, according to some embodiments.

Figure 1:
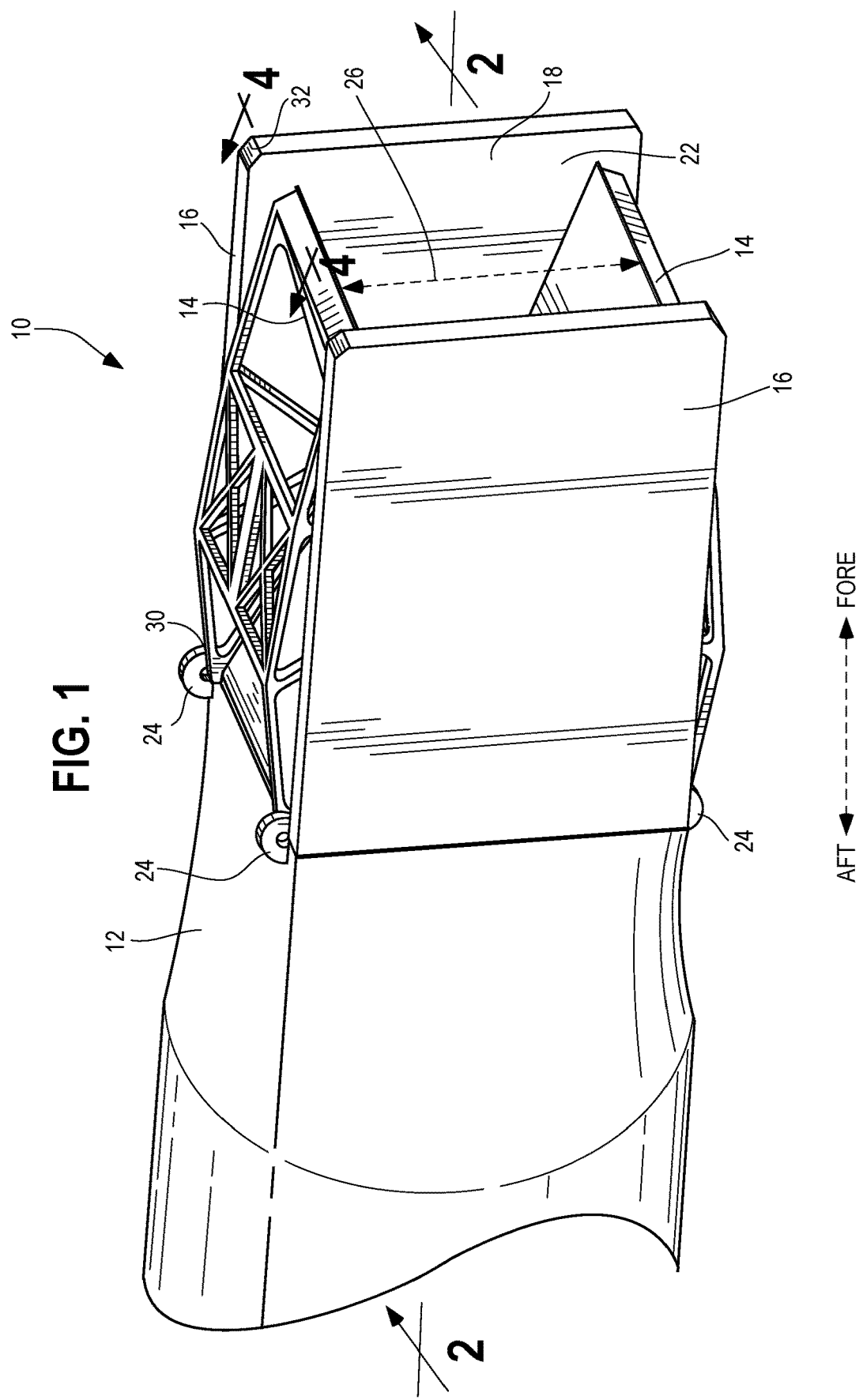
FIG. 1 is an illustration of a gas turbine engine having an adjustable nozzle assembly, which may utilize embodiments of the plunger apparatus provided herein.

Elements in the figures are illustrated for simplicity and clarity and have not necessarily been drawn to scale. For example, the dimensions and/or relative positioning of some of the elements in the figures may be exaggerated relative to other elements to aid in understanding various embodiments. Also, common but well-understood elements that are useful or necessary in a commercially feasible embodiment are often not depicted to facilitate a less obstructed view of these various embodiments.

DETAILED DESCRIPTION

To reduce the size of gaps between the flap and the nozzle sidewalls and to seal core air within the nozzle core, a seal assembly may be positioned between the nozzle flap and sidewall. In some instances, liners may be mounted to the nozzle sidewalls via one or more hangers. When the nozzle sidewall includes a liner, a seal assembly may be positioned between the flap and the sidewall liner, such that the seal seals against the sidewall liner rather than directly to the nozzle sidewall. Liners, including sidewall liners may distort, contour and warp during operation, and thus are not flat or of a consistent profile.

During operation of the nozzle, the flap may move in one or more directions relative to the nozzle sidewall. Thus, the seal assembly for the gap between the flap and the nozzle sidewall may need to accommodate for sliding motion. For example, the seal assembly may need to facilitate the sliding of the seal assembly along the nozzle sidewall while still maintaining a seal between the nozzle flap and sidewall. As such, the seal assembly may need to conform to the nozzle sidewall and/or liner when the nozzle sidewall and/or the liner, or portions thereof, distort or move.

Conventional plunger seals have a number of disadvantages. In general, they are rigid and extremely sensitive to wear and tear. In addition, known plungers typically have a substantial tradeoff between the conformability of the seal against a surface and the seal's effectiveness and reliability. Therefore, there remains a desire to have a plunger seal assembly that seals a movable or contoured surface such as a nozzle flap and/or sidewall more effectively and efficiently than known methods.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

A plunger seal assembly or apparatus and sealing method for sealing a dynamic gap in which there is a need to seal air from between a stationary structure and a movable surface or wall is provided herein. The plunger seal assembly comprises a number of plunger segments linked together using flexure elements bonded to the segments in a manner that allows the segments to move and conform to the movable surface. More specifically, the flexures and their placement between plunger segments allows each segment to relate to its neighboring plunger segments consistently and determinately without segment-to-segment leakage variation, binding, and unintended seal motion.

The flexures, each of which are coupled to an inner surface of two neighboring segments, are configured to pivot about a centroid (i.e., a virtual intersection of the flexure ligaments) such that a head of the flexure coupled to a respective segment allows the segment to seal against the movable wall as it contours, without interfering with the pivoting movement of the neighboring segments. The placement of each flexure is configured to allow a predetermined amount of space between segments to avoid potential binding or excessive gapping between plunger segments. The number of segments used within embodiments of the plunger assemblies herein may vary depending on a given application. More particularly, the number of segments used may be balanced relative to the amount of conformity required and a maximum amount of acceptable leakage between plunger segments.

FIG. 1 is an illustration of a nozzle assembly 10 within a gas turbine engine 12 that is provided herein as an exemplary application in which the plunger seal apparatuses and sealing methods provided herein may be employed. The apparatuses and methods are not limited to gas turbine engines and may be suitable for other applications that require sealing of high motion, high conformability surfaces, particular, and high temperatures, where elastomeric seals are not viable.

The plunger seal assembly and sealing methods provided herein overcome many of the challenges of conventional solutions. For example, because of the segmented configuration, targeted placement of the flexure elements between neighboring segments, and various other features, the embodiments herein minimize leakage. This leakage may have otherwise occurred, for example, via horizontal compression between neighboring plunger segments, lateral stack binding, and/or gapping of one or more plunger segments away from the contoured surface in a given dynamic gap application. These and other benefits and advantages will be discussed herein.

With reference to FIGS. 1-4, the gas turbine engine 12 is illustrated that produces core air flow. At the aft of the gas turbine engine 12 is a nozzle assembly 10 to control the effect of the discharged core air. The nozzle assembly 10 includes upper and lower flaps 14 mounted for movement relative to one another between two opposing sidewalls 16. A gap 42 is located between outer edges of the flaps 14 and the sidewalls 16. This gap 42 would allow air to exhaust inefficiently to the ambient surroundings without seals. The gas turbine engine 12 discharges exhaust gases, also referred to as core air, into the nozzle assembly 10. The nozzle assembly 10 may include one or more flaps 14 and one or more sidewalls 16. In this exemplary embodiment, the nozzle assembly 10 includes two opposing, sidewalls 16 and two opposing, flaps 14. In some embodiments, one or more of the sidewalls 16 further include a liner 18 mounted to the sidewall via one or more hangers 20. The flaps 14 may be movable relative the sidewalls 16, which may be generally stationary. By some approaches, the flaps 14 may be pivotally supported by the gas turbine engine 12 at a fore end 30 of the nozzle assembly 10. The flaps 14 may be pivotally supported, for example, by rotating means such as hinges 24 that couple the flaps 14 to the gas turbine engine 12.

The flaps 14 and sidewalls 16 define a nozzle core 22 that bounds core air exiting the gas turbine engine 12. Core air from the gas turbine engine 12 flows through the nozzle core 22 to create thrust for the gas turbine engine 12. Core air may flow through the nozzle core 22 from the fore end 30 to an aft end 32 of the nozzle assembly 10. The aft end 32 of the nozzle assembly 10 defines an outlet 26, which is generally rectangular, for discharging core air from the nozzle assembly 10 to the ambient environment. In some approaches, the flaps 14 are movable to direct the flow and pressure of core air within the nozzle core 22. For example, the flaps 14 may be vertically movable to adjust the size of the outlet 26 of the nozzle assembly 10.

Figure 2:
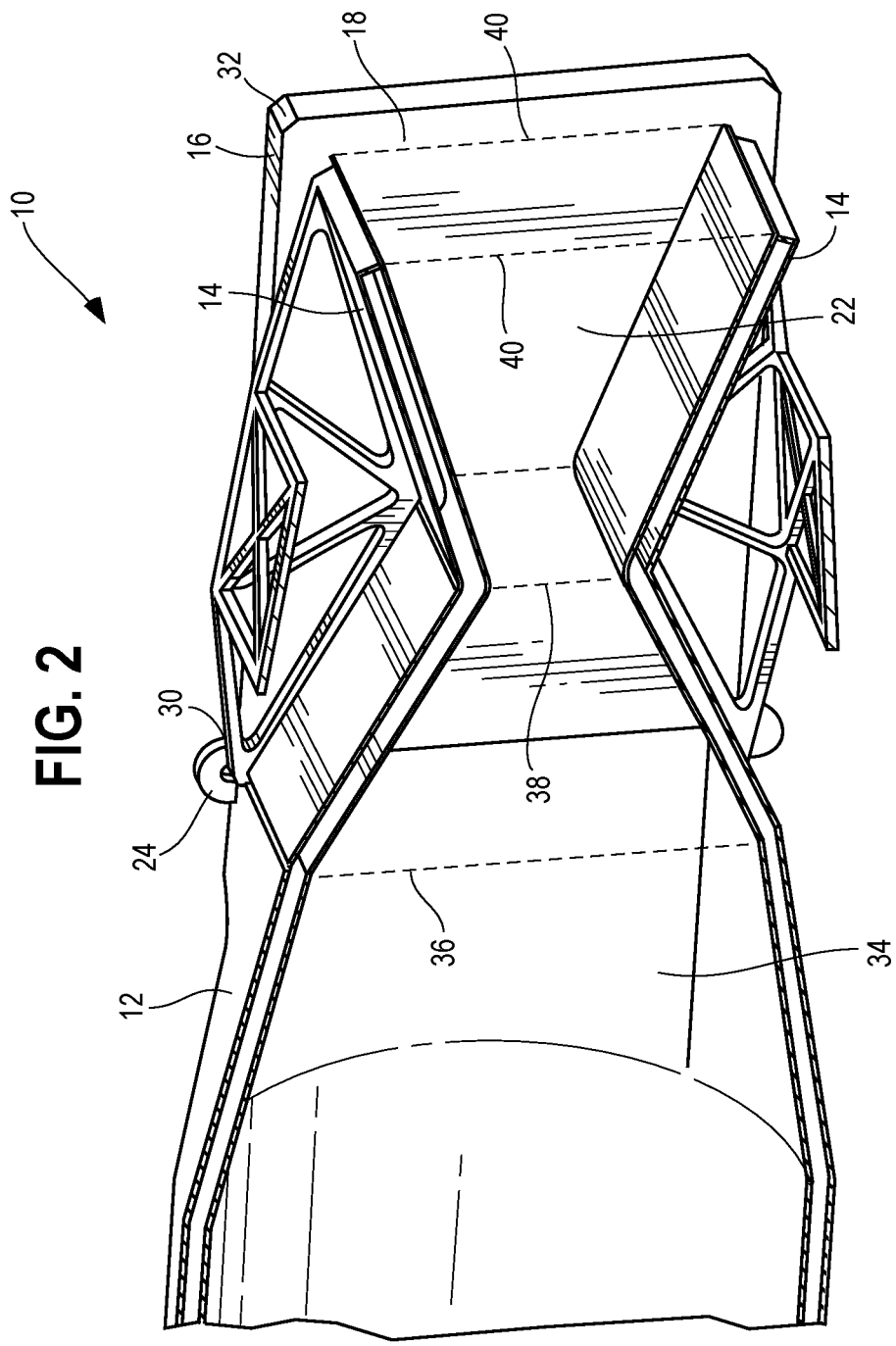
FIG. 2 is a cross-sectional view of the nozzle assembly of FIG. 1 taken along line 2-2 of FIG. 1.

Turning to FIG. 2, an engine core 34 of the gas turbine engine 12 is upstream of the nozzle assembly 10 such that core air flows from the engine core 34 into the nozzle core 22. In some embodiments, the flaps 14 of the nozzle assembly 10 are actuated to vary the one or more cross-sectional areas of the nozzle core 22. In this manner, the nozzle assembly 10 is a variable two-dimensional nozzle assembly. The flaps 14 may be actuated, for example by pivoting about the hinges 24. The nozzle core 22 includes a first cross-sectional area 36, a second cross-sectional area 38, and a third cross-sectional area 40. The flaps 14 control the size of the second cross-sectional area 38 and the third cross-sectional area 40.

During operation of the gas turbine engine 12, the flaps 14 create a pressure gradient in the nozzle core 22 of the nozzle assembly 10. For example, pressure of the core air in the nozzle core 22 decreases from the fore end 30 to the aft end 32 of the nozzle core 22. That is, the pressure of the core air decreases from the first cross-sectional area 36 to the second cross-sectional area 38 to the third cross-sectional area 40. The two-dimensional cross-section allows for different nozzle packaging and more readily adjustable cross-sectional areas 36, 38, 40 for matching both thrust and operability across the entire range of engine operating conditions.

Figure 3:
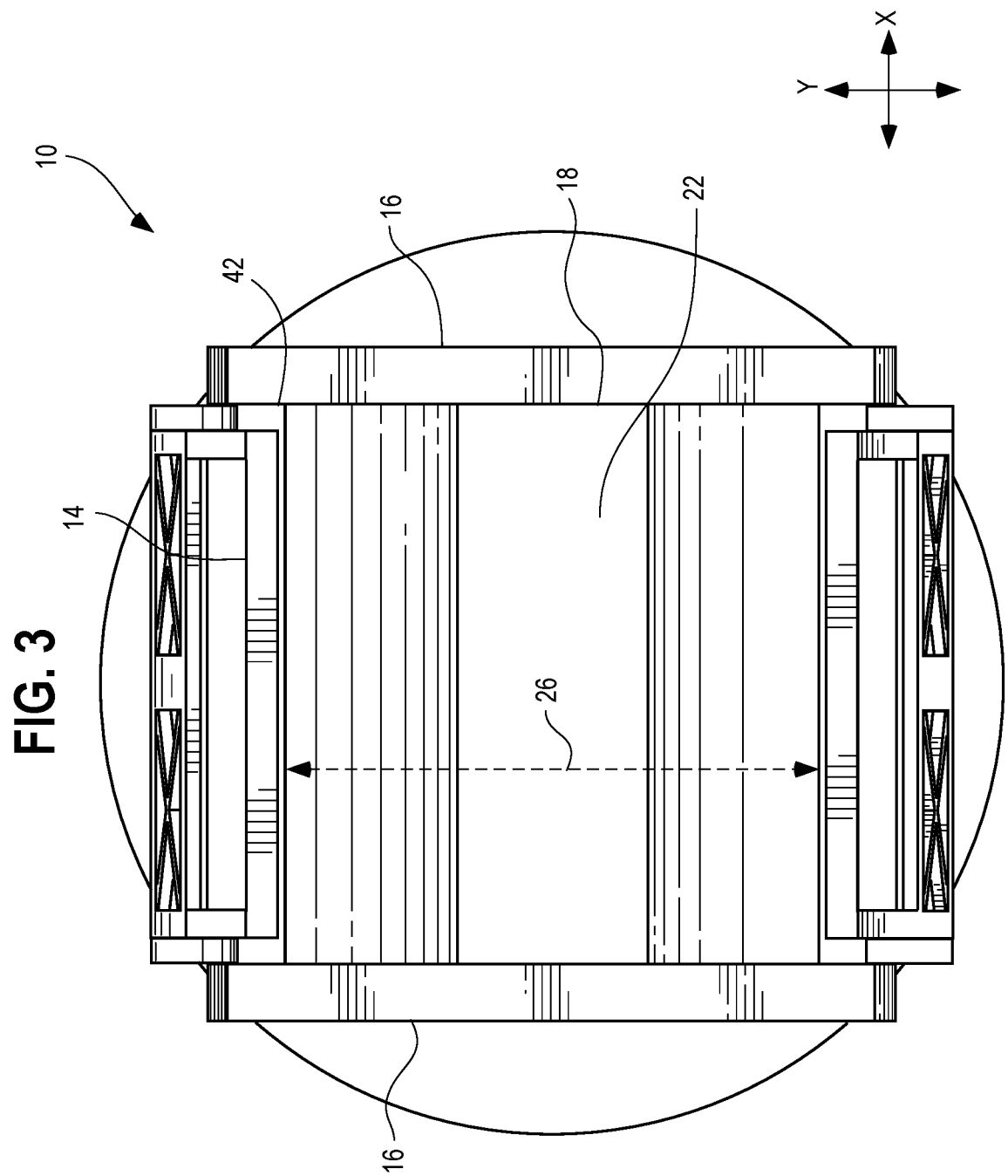
FIG. 3 is an end elevation view of the nozzle assembly of FIG. 1 taken from an aft end of the nozzle assembly.

Turning to FIG. 3, the gap 42 between the flap 14 and the sidewall 16 extends along the length of the flap 14 (i.e., from the fore end 30 to the aft end 32 of the nozzle assembly as shown in FIG. 1). The gap 42 may be continuous or interrupted at one or more locations. The size of the gap 42 may vary dynamically during operation of the nozzle assembly 10. During operation, the flaps 14 may move along the Y-direction shown in FIG. 3. This motion of the flaps 14, for example, varies the size of the outlet 26 of the nozzle assembly 10. Additionally, during operation, the sidewall 16 may shift along the X-direction shown in FIG. 3. For example, the pressure of core air in the nozzle core 22 may urge the sidewall 16 away from the flap 14, increasing the size of the gap 42. Accordingly, the gap 42 may be narrower when the nozzle core 22 is at atmospheric pressure than when the nozzle core 22 receives engine core air during operation of the nozzle assembly 10. In addition to motion of the sidewall 16, the liner 18 of the sidewall 16 may also distort during operation, causing the liner 18 to shift along one or more of the X-direction and Y-direction. Such distortion of the liner 18 may occur, for example, due to changes in temperature and pressure along the nozzle core 22. A plunger seal assembly 50 (not shown in FIG. 3) may be installed in the gap 42 between the flap 14 and the sidewall 16. In some embodiments, the plunger seal assembly 50 is the plunger seal assembly 50 depicted in FIGS. 5-9.

Figure 4:
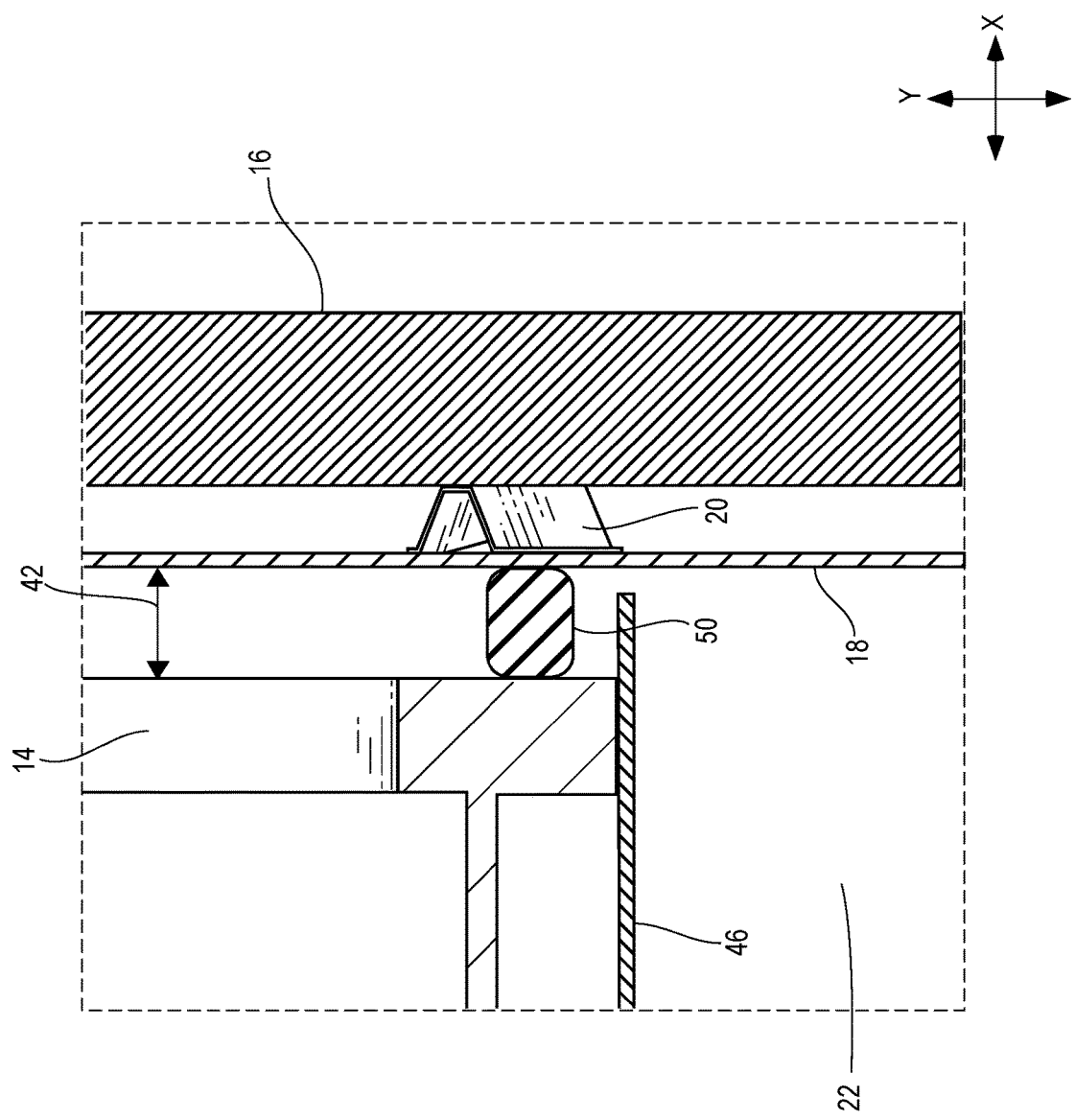
FIG. 4 is a cross-sectional view of section 4-4 of the nozzle assembly of FIG. 1.

With reference to FIG. 4, the gap 42 extends generally between the flap 14 and the sidewall 16. In the nozzle assembly 10, the sidewall 16 includes the liner 18, which is mounted to the sidewall 16 via the hangers 20. Accordingly, the gap 42 extends between the flap 14 and the liner 18. The flap 14 may further include a flap liner 46 positioned at an end of the flap 14 adjacent the nozzle core 22. The flap liner 46, or portions thereof, may extend into the gap 42. The nozzle assembly 10 includes a plunger seal assembly 50 positioned in the gap 42 between the flap 14 and the sidewall 16. The plunger seal assembly 50 bridges the gap 42 between the flap 14 and the sidewall 16 to seal the gap 42. The plunger seal assembly 50 may reduce the size of the gap 42 or eliminate the gap 42. In this manner, the plunger seal assembly 50 reduces the excursion of core air from the nozzle core 22 through the gap 42 which may decrease or effect the flow of core air from the nozzle core 22 to the ambient environment surrounding the nozzle assembly 10.

Figure 5:
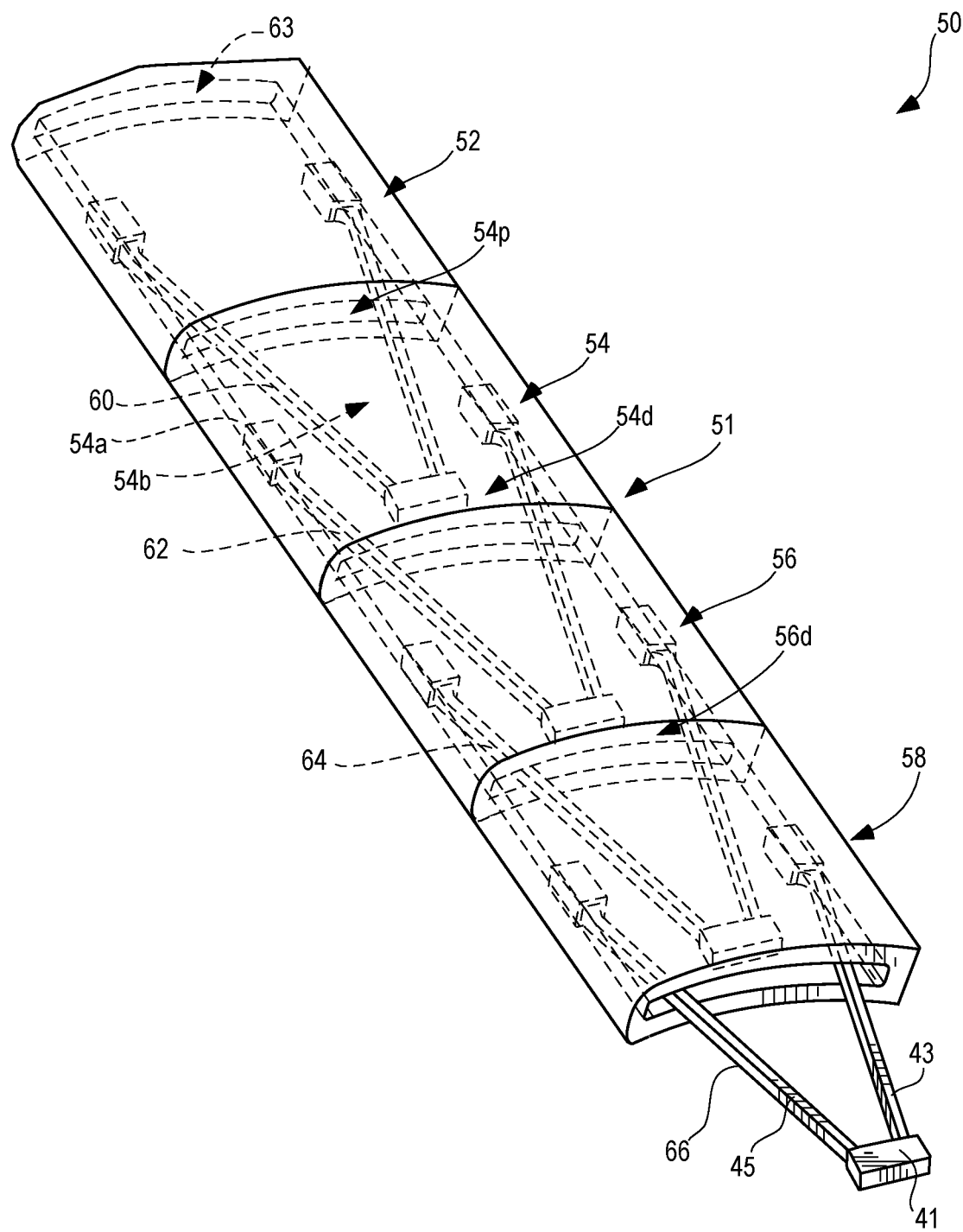
FIG. 5 is a perspective view of a plunger seal assembly, in accordance with some embodiments.
Figure 6:
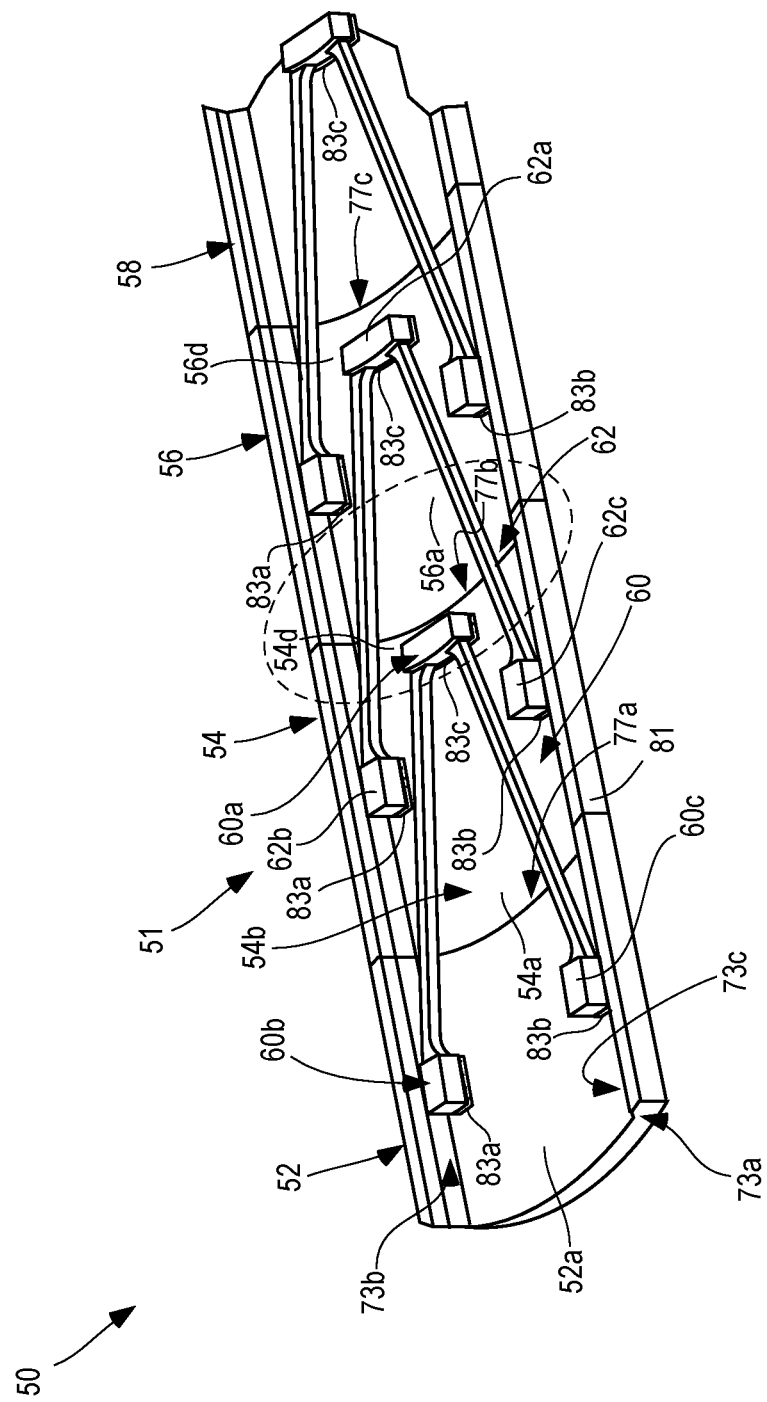
FIG. 6 is a perspective view of the plunger seal assembly of FIG. 5, with the upper wall of the plunger segments removed to more clearly illustrate the flexures within the seal assembly channel.

Turning to FIGS. 5 and 6, the plunger seal assembly 50 is shown in more detail including in the illustrated example that the plunger seal assembly 50 has a plurality of plunger segments 51. The plunger segments 51 include a first plunger segment 52, a second plunger segment 54, a third plunger segment 56, and a fourth plunger segment 58. For simplicity, we will describe the relationship between the first plunger segment 52, the second plunger segment 54, and the third plunger segment 56. As illustrated, the second plunger segment 54 includes a hollow body 54*b* defining an interior 54*a*, a proximal end 54*p* and a distal end 54*d*, wherein the distal end 54*d* is spaced from the proximal end 54*p*. The first plunger segment 52 is located at the proximal end 54*p* of the second plunger segment 54 and the third plunger segment 56 located at the distal end 54*d* of the second plunger segment 54. The second plunger segment 54 may be provided having a columnar geometry defined by an upper wall, a lower wall, two sidewalls (e.g., sidewall 81), and a channel or void defined therein as illustrated. However, other suitable geometries are also envisioned. The fourth plunger segment 58 is located at a distal end 56*d* of the third plunger segment 56. Though not shown in FIGS. 5 and 6, it is contemplated that additional plunger segments may be coupled to the fourth plunger segment 58.

The number of plunger segments 51 of the plunger seal assembly 50 and the dimensions of the first plunger segment 52, the second plunger segment 54, the third plunger segment 56, and the fourth plunger segment 58 may be selected based on the dimensions of a specific gap 42 and that needs to be sealed. In an embodiment, for example, the plunger segments 51 may have identical dimensions suitable for a given application. In some embodiments, the plunger segments 51 have different dimensions. However, even in embodiments where the plunger segments 51 do not have identical dimensions, the flexural radius and interface curvature, as illustrated by arrow 79 in FIG. 9, between neighboring plunger segments must be identical. The features and benefits described may be applied to each of the plunger segments 51. Further still, while each of the plunger segments 51 has been illustrated and described as being identical or substantially identical it is contemplated that they need not be. When the plunger segments 51 are operably coupled together end to end, respectively, as described herein, the respective interiors of the plunger segments 51 form a plunger channel 63.

The plunger segments 51 may be formed of a metallic or ceramic alloy material. The plunger segments 51 may be traditionally machined, stamped MIM, Cast, EDMed, additively grown, or otherwise manufactured using any appropriate industrial fabrication method.

The plunger segments 51 are coupled or interlocked lengthwise using a plurality of flexural support elements or flexural pivots (e.g., flexures 60, 62, 64, 66, respectively) coupled thereto. When the plunger segments 51 are coupled or interlocked lengthwise the plunger channel 63 is created. The flexures 60, 62, 64, 66 are referred to herein as flexures for simplicity. In the illustrated embodiment, flexures 60, 62, 64, 66 have a hairpin or wishbone shape having a head 41 and two extending arms, ligaments or stems (e.g., stems 43, 45) as illustrated in FIGS. 5-9. The flexures 60, 62, 64, 66 may have other configurations, profiles, shapes, or designs, (not shown) including by way of further non-limiting examples triangular, trapezoidal, butterfly, biaxal, etc. Further still, while each of the flexures has been illustrated and described as being identical or substantially identical it is contemplated that they need not be.

As illustrated in FIG. 6, the flexure 60 is coupled to the first plunger segment 52 and the second plunger segment 54. (For purposes of illustration, the upper walls of the plunger segments 51 are not shown in FIG. 6 in order to provide visibility to the flexure 60 and the flexure 62 within the plunger channel 63.) As such, each flexure 60, 62, 64, 66 may be coupled to an inner surface as defined by the interior 54*a* of the hollow body 54*b* of its two neighboring plunger segments at multiple points or interfaces 83*a*, 83*b*, 83*c*. For example, the flexure 60 has three bonding pads 60*a*, 60*b*, 60*c*. As shown, the head bonding pad 60*a* is coupled to the interior 54*a* of the second plunger segment 54 towards its distal end 54*d* at interface 83*c*. The two stem bonding pads 60*b*, 60*c* are secured to the interior 52*a* of neighboring plunger segment 52 at interface 83*a* and interface 83*b*. Similarly, flexure 62 also three bonding pads 62*a*, 62*b*, 62*c*. Head bonding pad 62*a* is coupled to an interior 56*a* of the third plunger segment 56 towards its distal end 56*d*. The two stem bonding pads 62*b*, 62*c* are coupled to the interior 54*a* of the second plunger segment 54. Vertical sidewall 81 is the exterior surface or portion of the plunger seal assembly 50 in contact with the sidewall 16 in FIG. 8.

The methods of coupling the flexures 60, 62, 64, 66 to the plunger segments 51 herein may vary based on a type of flexure material and/or plunger material used. Suitable methods may include, for example, bonding, soldering, welding, braising, or other adhesive coupling or mechanical attachment methods. As such, interfaces 83*a*, 83*b*, 83*c* may include adhesive or other bonding materials depending on the method of coupling used.

Figure 7:
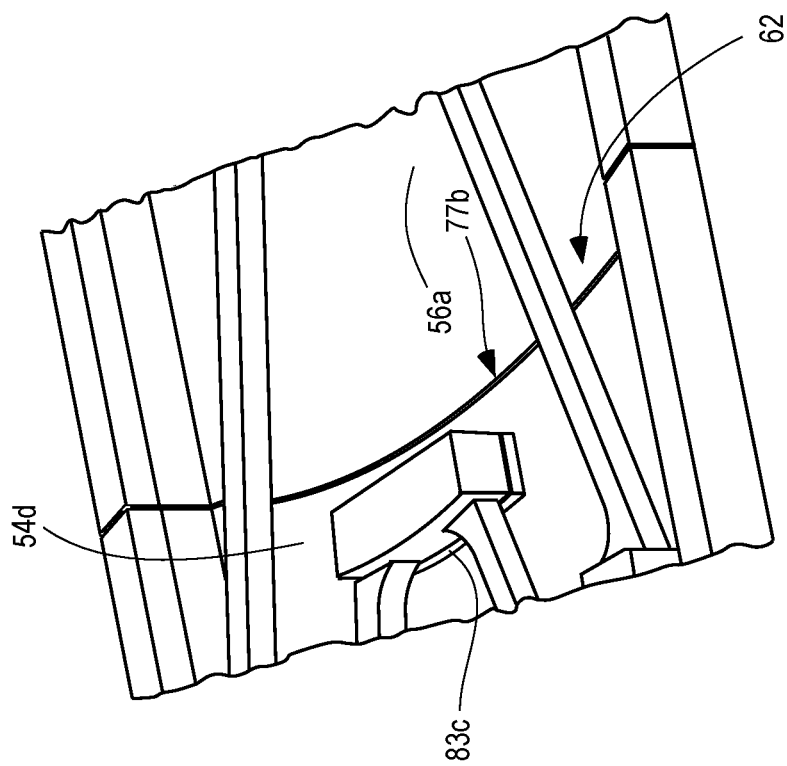
FIG. 7 is an enlarged view of the encircled area in FIG. 6.

The flexures (e.g., flexures 60, 62) utilized in the embodiments of the plunger seal assembly 50 are coupled in a nested fashion within the plunger channel 63. This placement enables maintains a precise frictionless gap or space (e.g., predetermined spaces 77*a*, 77*b*, 77*c*) between a given plunger segment and its neighboring plunger segments. While not apparent in the figures, predetermined space 77*a* is present between the first plunger segment 52 and the second plunger segment 54. Predetermined space 77*b* is present between the second plunger segment 54 and the third plunger segment 56. Similarly, predetermined space 77*c* is present between the third plunger segment 56 and the fourth plunger segment 58. The enlarged view in FIG. 7 illustrates the predetermined space 77*b*. In some approaches, the predetermined spaces 77*a*, 77*b*, 77*c* are substantially uniform. That is, the predetermined spaces 77*a*, 77*b*, 77*c* are substantially equidistance along their length.

In addition, in an embodiment, the stem bonding pads 60b, 60c of one or more flexures (e.g., flexure 60) may be coupled to both the lower inner surface 73a of the first plunger segment 52, as well as the inner sidewalls 73b, 73c, respectively. In this way, the stem bonding pads 60b, 60c are further secured to the first plunger segment 52. The strength of the bonding or coupling of the bonding pads 60a, 60b, 60c to the plungers at the respective interfaces 83a, 83b, 83c may be increased as necessary to ensure proper operation of the plunger seal assembly 50. In operation, the flexures 60, 62, 64, 66 create a restorative force that resists the hinging motion of the plunger seal assembly 50 and must be designed in conjunction with the pressure, preload springs/actuators to provide sufficient driving force for actuation.

Figure 8:
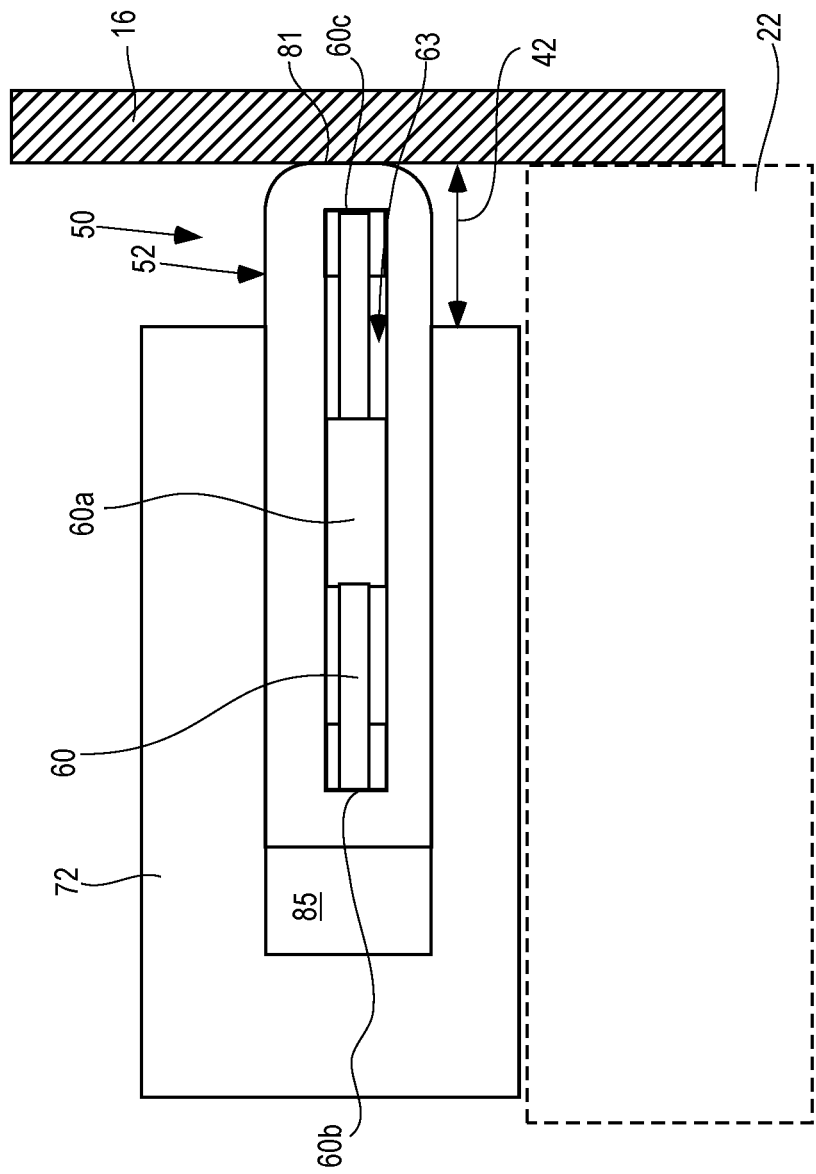
FIG. 8 is a cross-section view of a plunger segment positioned within a seal housing and against a sidewall, for sealing air from the pressurized environment, according to some embodiments.

FIG. 8 illustrates a cross-sectional view of an embodiment of a plunger seal assembly 50 for sealing air from the nozzle core 22 seeking to pass through the gap 42. The flexure 60 is disposed within the plunger channel 63, along a plane in the z direction. In an embodiment, the first plunger segment 52 may be disposed within a seal housing 72. The seal housing 72 may be a removable or integral part of a flap (e.g., the flap 14 in FIGS. 1-4) that provides a tightly controlled interface for the plunger seal assembly 50 to slide in and out of, as well as secondary retention to prevent the plunger seal assembly 50 from falling out on disassembly. The seal housing 72 may be a tightly controlled opening or slot 85. The faying surfaces within the slot 85 that interface with the plunger seal assembly 50 may or may not be coated for wear, friction, thermal, or chemical benefit. In addition, the plunger seal assembly 50 may interface with the slot 85 and the sidewall 16 to create pressure gradients that load at least a portion of the plunger seal assembly 50 into the seal housing 72 and maintain a seal against the sidewall 16.

In this embodiment, the first plunger segment 52, as part of a plunger seal assembly 50 (the remainder of which is not visible) seals against core air from the nozzle core 22 seeking to pass through gap 42 into the ambient surroundings. However, the sidewall 16 may also correspond to other applications requiring an airtight seal along an analogous contoured or movable surface.

Figure 9:
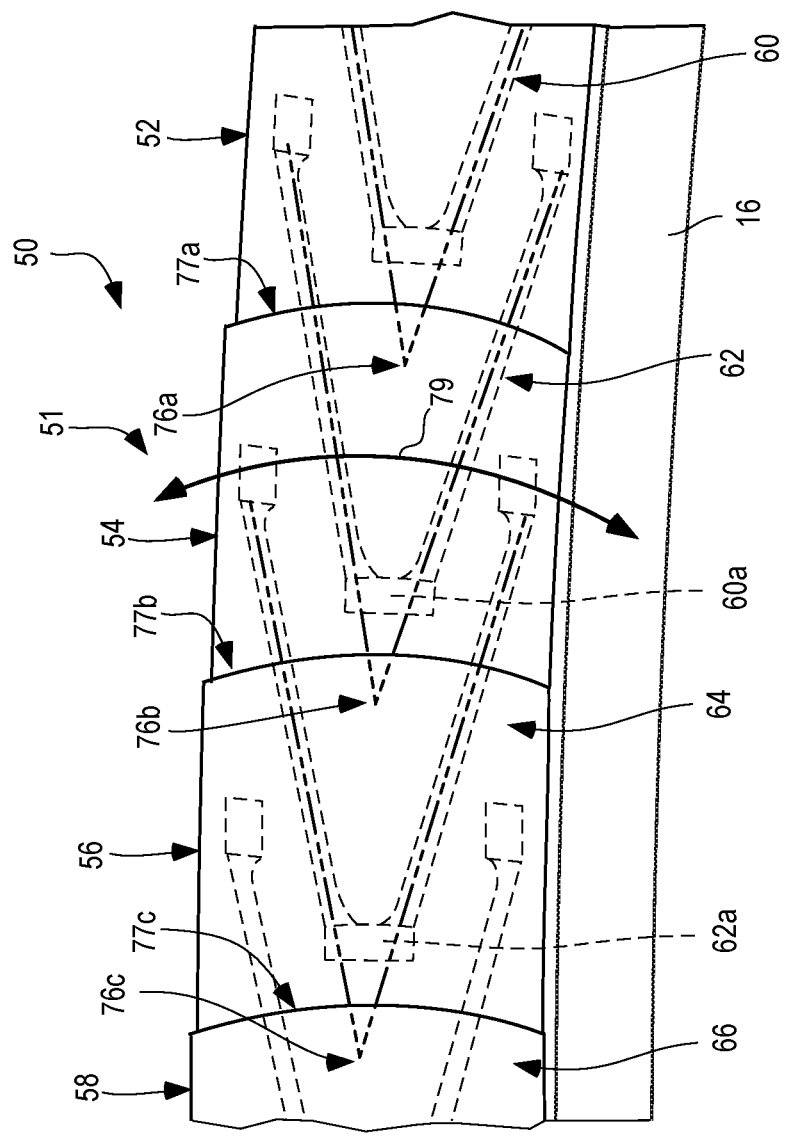
FIG. 9 is a perspective view of the plunger seal assembly of FIG. 5 positioned against a contoured sidewall.

FIG. 9 further depicts the location of a plurality of pivot points 76a, 76b, and 76c corresponding to the flexures 60, 62, 64, respectively, within the plunger segments 51. Pivot points 76a, 76b, 76c located at the centroid or projected intersection of the stems of a given flexure (see dotted lines in FIG. 9). For example, pivot points 76a, 76b, 76c are the location about which a head (e.g., bonding pad 60a, bonding pad 62a) of the flexures 60, 62, 64 rotates to allow at least one of the plunger segments 51 to move and conform relative to the movement of the sidewall 16. The placement of each of the flexures 60, 62, 64 is provided such that there is a minimal distance between neighboring segments. The predetermined spaces 77a, 77b, 77c are provided between the plunger segments 51 to facilitate this. For example, when the sidewall 16 moves the first plunger segment 52, the flexure 60 pivots about pivot point 76a, such that the second plunger segment 54 is not interfered with. Similarly, flexure 62 pivots about point 76b such that neither the third plunger segment 56 nor the first plunger segment 52 are interfered with when the sidewall 16 moves adjacent the second plunger segment 54.

The location of the attachment of a given head bonding pad (e.g., bonding pad 60a, bonding pad 62a) enables the plunger seal assembly 50 to maintain the predetermined spaces 77a, 77b, 77c between the plunger segments 51. The plunger segments 51 are interlocked in a repeating pattern so that each of the plunger segments 51 in the plunger seal assembly 50 is not able to move beyond a predefined distance during contouring or movement of the sidewall 16. For example, the second plunger segment 54 is interlocked with the first plunger segment 52 and the third plunger segment 56 so that the second plunger segment 54 cannot move beyond a predefined distance from the first plunger segment 52 and the third plunger segment 56.

The geometry (more or less acute, longer vs shorter ligaments, etc.) of the flexures (e.g., flexures 60, 62, 64, 66) in the embodiments herein are selected to provide a desired maximum amount of rotation before clashing. In other words, each flexural stem will contact its respective plunger segment and clash if the plunger segment is over-flexed, leading to disrupted operation of the plunger seal assembly 50. As such, in some aspects, a ratio between the extended distance and the retracted distance of each of the flexures 60, 62, 64, 66 is low. By selecting the geometry appropriately, the plunger seal assembly 50 will increase the pressure balance when inserted into a slot against the sidewall 16.

In addition, the flexure placement enables movement of the entire plunger seal assembly 50 relative to the sidewall 16, without the wear and tear, stack binding, or gapping that might occur in other conventional stacked seal assemblies (e.g., hinged wafer assemblies).

Figure 10:
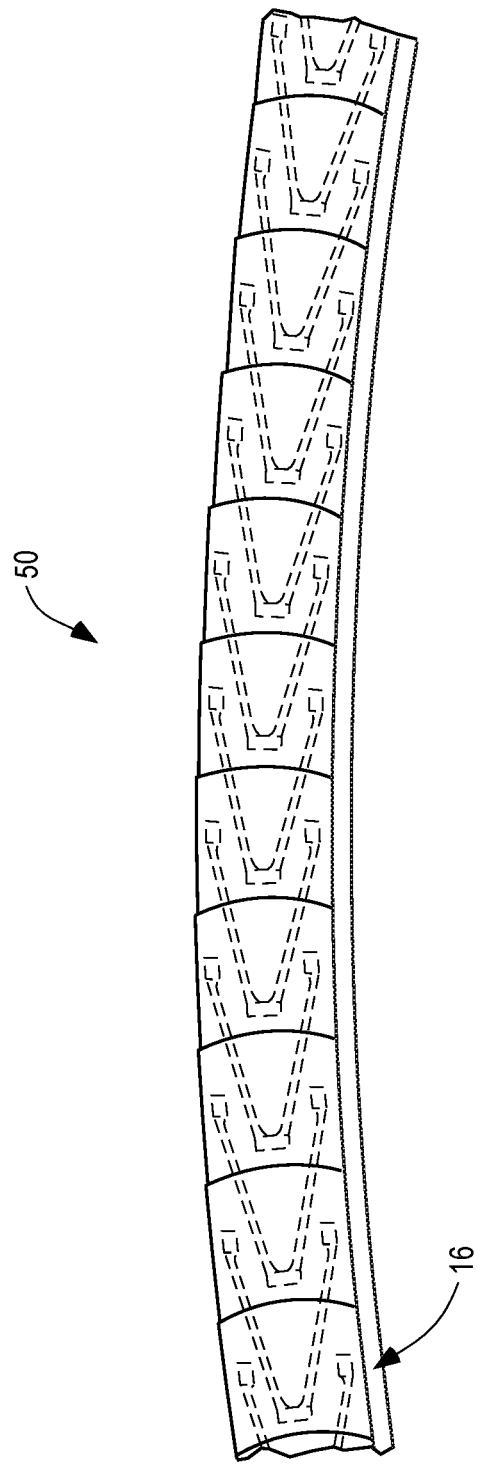
FIG. 10 is a perspective view of the plunger seal assembly of FIG. 5 positioned against a contoured sidewall, the plunger seal assembly including additional plunger segments and flexures.
Figure 1:
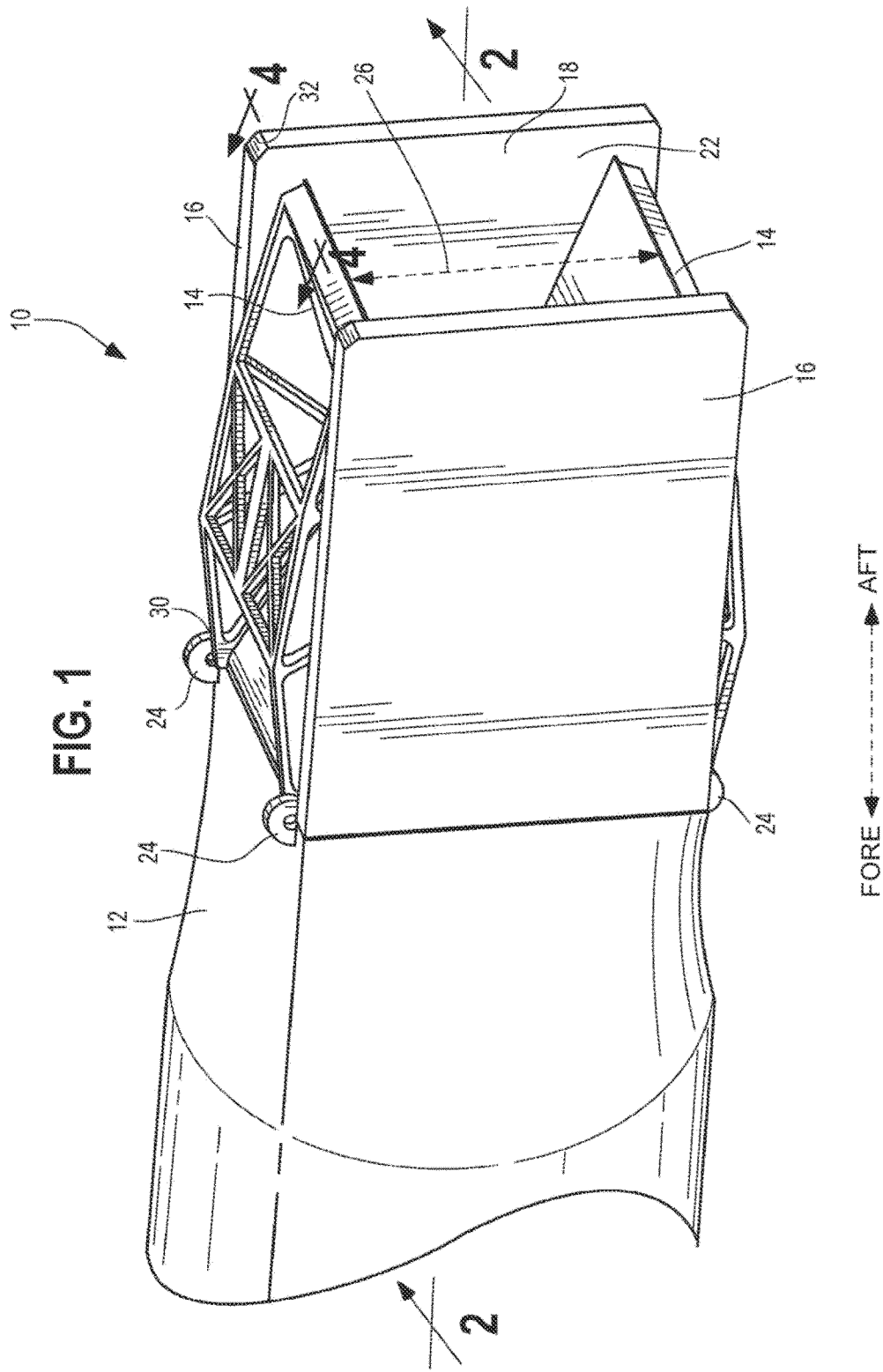

FIG. 10 is a perspective view of a plunger seal assembly 50 similar to that shown and described in FIG. 5 for sealing against the sidewall 16. It will be understood that the illustrated plunger seal assembly 50 has been shown with additional plunger segments and corresponding flexures. It is contemplated that any suitable number of plunger segments and flexures may be used and, further, that the plunger seal assembly 50 may be any length.

The selection of materials for each of the flexures 60, 62, 64, 66 depends on the operational temperature of the specific application in which the plunger seal assembly 50 is required. In one non-limiting operational example, the flexures 60, 62, 64, 66 may be formed of a metallic or ceramic alloy capable of withstanding temperatures greater than or equal to 500-2000 degrees Fahrenheit, which corresponds to the operational temperature of a gas turbine engine whose nozzle is depicted in FIGS. 1-4. The combination of flexure materials and plunger segments materials are selected based on an amount of desired or acceptable leakage variation. For example, if sealing at only one temperature is required and compensated for by matching geometric gaps with thermal growth of the flexures 60, 62, 64, 66, high and low alpha materials could be interchanged without adverse effect. However, in applications where the plunger seal assembly 50 must operate over a large range of temperatures, the flexure materials and the plunger segment materials should be selected to have a similar coefficient of expansion. In the latter example, materials for the flexures 60, 62, 64, 66 and the plunger segments 51 would be selected such that the gap between the plunger segments 51 does not close or open too much throughout the operational temperature range. For example, but not limited to, two nickel super alloys like Rene 77 and Inconel 718 plus have similar alphas across a broad range of temperatures and may meet the requirements of the design. Many other material matches can be chosen should their thermal growth and material properties sufficiently match the operating conditions required. Materials selection in accordance with these principles provides the benefit of avoiding any wanted growth of the plunger segments 51 relative to the flexures 60, 62, 64, 66 when the plunger seal assembly 50 is exposed to heat, thereby minimizing leakage.

In some embodiments, preloaded springs or actuators may be used to supplement, augment, or replace a pressure load for some operational conditions. For example, when the gas turbine engine 12 is off, there is no pressure to drive the plunger seal assembly 50 into position. Accordingly, an actuation mechanism such as a spring behind each plunger segment, or intermittent plunger segments may be used to nudge or ensure sufficient contact between the plunger segments 51 and the sidewall 16 when the pressure differential is not sufficient.

FIG. 11 illustrates an actuated plunger seal assembly 50a, in accordance with some embodiments. The actuated plunger seal assembly 50a includes an actuation mechanism 80a. The actuation mechanism 80a may be, for example, a spring or a plunger assembly. The actuation mechanism 80a is disposed in the slot 85 between the plunger segment 52a and the seal housing 72. The actuation mechanism 80a urges the first plunger segment 52 toward the sidewall 16 to seal the gap 42.

FIG. 12 is a flow chart diagram of a method 100 of sealing a gap between a stationary structure and a movable surface. The method 100 includes positioning, at 102, the plunger seal apparatus within the gap against the movable surface. The plunger seal apparatus includes a plurality of plunger segments interconnected using a plurality of flexures. The flexures are bonded at multiple points within an inner surface of each of the plunger segments such that a head of each flexure is configured to rotate about a pivot point corresponding to an arc of a corresponding one of the plurality of plunger segments. The method 100 further includes sealing the gap, at 104, by allowing rotation of each of the plurality of plunger segments about their respective pivot points, such that the plunger assembly contours relative to the movement of the movable surface.

It is contemplated that the plunger seal assembly 50 may be installed in any gap between a movable flap and stationary structure or against any movable surface. Further, it is to be understood that the plunger seal assembly 50 is not limited to use in the nozzle assembly 10 but may be used to create a seal for any pressurized environment.

Further aspects of the invention are provided by the subject matter of the following clauses:

A plunger seal apparatus for sealing a gap, the plunger seal apparatus comprising: a first plunger segment having a first proximal end, a first distal end, and a first channel defined therein; a second plunger segment having a second proximal end, a second distal end, and a second channel defined therein; and a first flexure secured within the first channel and the second channel for coupling the first plunger segment to the second plunger segment, a placement of the first flexure defining a predetermined distance between the first distal end and the second proximal end and forming a plunger channel through the first channel and the second channel.

The plunger seal apparatus of any preceding clause, wherein the first flexure has a head portion coupled to the first plunger segment and two stem portions coupled to an inner surface of the second plunger segment.

The plunger seal apparatus of any preceding clause, wherein the head portion of the first flexure is configured to pivot about a centroid located within a third plunger segment, the third plunger segment located adjacent to the first plunger segment.

The plunger seal apparatus of any preceding clause, wherein the first flexure, the first plunger segment, and the second plunger segment are each comprised of at least one of a metallic material and a ceramic material.

The plunger seal apparatus of any preceding clause, further comprising a seal housing disposed within the gap and enclosed about a portion of the first plunger segment and the second plunger segment.

The plunger seal apparatus of any preceding clause, further comprising an actuation mechanism adjacent to at least one of the first plunger segment and the second plunger segment to urge at least one of the first plunger segment and the second plunger segment towards a stationary structure at least partially defining a gap.

The plunger seal apparatus of any preceding clause, wherein the plunger seal apparatus is configured to operate in temperatures between 500 and 2000 degrees Fahrenheit.

An exhaust nozzle for an engine comprising: a sidewall; a movable flap adjacent the sidewall; and a plunger seal apparatus disposed between the stationary sidewall and the movable flap to seal a gap between the sidewall and the movable flap, the plunger seal apparatus being configured to contour along at least a portion of the movable flap when the exhaust nozzle is in operation, the plunger seal apparatus comprising: a plurality of flexures; and a plurality of plunger segments, including at least a first plunger segment and a second plunger segment, the first plunger segment being coupled to the second plunger segment via at least one of the plurality of flexures, and wherein the plurality of plunger segments are connected end to end such that a channel is defined within the plunger seal apparatus.

The exhaust nozzle of any preceding clause, wherein each of the plurality of flexures comprises a head and two stem portions secured within neighboring plunger segments.

The exhaust nozzle of any preceding clause, wherein a pivot point of a given flexure within the plurality of flexures is located in a centroid within a neighboring plunger segment that is different than a plunger segment in which the head is secured.

The exhaust nozzle of any preceding clause, wherein the plurality of plunger segments are located at a predetermined distance between each other based on a placement of the plurality of flexures coupled thereto.

The exhaust nozzle of any preceding clause, wherein a material of the plurality of flexures is comprised of at least one of a metallic material and a ceramic material; and wherein a material of the plurality of plunger segments is comprised of at least one of a metallic material and a ceramic material.

The exhaust nozzle of any preceding clause, wherein the first plunger segment is further coupled to a third plunger segment using another one of the plurality of flexures.

The exhaust nozzle of any preceding clause, wherein the plurality of plunger segments comprise at least one of a plurality of machined plunger segments, plurality of stamped plunger segments, plurality of casted plunger segments, and plurality of additively manufactured plunger segments.

A method of sealing a gap, the method comprising: positioning a plunger seal apparatus within the gap against the movable surface, the plunger seal apparatus having a plurality of plunger segments interconnected using a plurality of flexures, the flexures being coupled at multiple points to an inner surface of the plurality of plunger segments such that a head of each flexure is configured to rotate about a pivot point located within a neighboring plunger segment; and sealing the gap by allowing rotation of at least some of the plurality of plunger segments about their respective pivot points, such that the plunger assembly contours against at least a portion of the movable surface when moving.

The method of any preceding clause further comprising defining a predetermined distance between each of the plurality of plunger segments using the plurality of flexures.

The method of any preceding clause, wherein the predetermined distance is substantially uniform between each of the plurality of plunger segments.

The method of any preceding clause, wherein the plurality of flexures are coupled to the inner surface of the plurality of plunger segments using at least one of bonding, soldering, welding, braising, and adhesive methods.

The method of any preceding clause, wherein the plurality of plunger segments are fabricated using at least one of a machining process, a stamping process, a casting process, and an additive manufacturing process.

The method of any preceding clause, wherein the plunger seal apparatus is configured to operate in temperatures between 500 and 2000 degrees Fahrenheit.

It will be understood that various changes in the details, materials, and arrangements of parts and components which have been herein described and illustrated to explain the nature of the dynamic seals between moving components and stationary components may be made by those skilled in the art within the principle and scope of the appended claims. Furthermore, while various features have been described with regard to particular embodiments, it will be appreciated that features described for one embodiment also may be incorporated with the other described embodiments.

What is claimed is:

1. A plunger seal apparatus for sealing a gap, the plunger seal apparatus comprising:
   a first plunger segment having a first proximal end, a first distal end, and a first channel defined therein;
   a second plunger segment having a second proximal end, a second distal end, and a second channel defined therein; and
   a first flexure secured within the first channel and the second channel for coupling the first plunger segment to the second plunger segment, a placement of the first flexure defining a predetermined space between the first distal end and the second proximal end and forming a plunger channel through the first channel and the second channel, wherein the first flexure has a head portion coupled to the first plunger segment and two stem portions coupled to an inner surface of the second plunger segment.

2. The plunger seal apparatus of claim 1, wherein the head portion of the first flexure is configured to pivot about a centroid that is external to the second plunger segment.

3. The plunger seal apparatus of claim 1, wherein the first flexure, the first plunger segment, and the second plunger segment are each comprised of at least one of a metallic material and a ceramic material.

4. The plunger seal apparatus of claim 1, further comprising a seal housing disposed within the gap and enclosed about a portion of the first plunger segment and the second plunger segment.

5. The plunger seal apparatus of claim 1, further comprising an actuation mechanism adjacent to at least one of the first plunger segment and the second plunger segment to urge at least one of the first plunger segment and the second plunger segment towards a stationary structure at least partially defining the gap.

6. The plunger seal apparatus of claim 1, wherein the plunger seal apparatus is configured to operate in temperatures between 500 and 2000 degrees Fahrenheit.

7. An exhaust nozzle for an engine, comprising:
   a sidewall;
   a movable flap adjacent the sidewall; and
   a plunger seal apparatus disposed between the sidewall and the movable flap to seal a gap between the sidewall and the movable flap, the plunger seal apparatus being configured to contour along at least a portion of the movable flap when the exhaust nozzle is in operation, the plunger seal apparatus comprising:
      a plurality of flexures, wherein at least one of the plurality of flexures comprises a head and two stem portions secured within neighboring plunger segments; and
      a plurality of plunger segments, including at least a first plunger segment and a second plunger segment, the first plunger segment being coupled to the second plunger segment via at least one of the plurality of flexures, and wherein the plurality of plunger segments are connected end to end such that a channel is defined within the plunger seal apparatus.

8. The exhaust nozzle of claim 7, wherein a pivot point of a given flexure within the plurality of flexures is located in a centroid that is external to a plunger segment in which the two stem portions are secured.

9. The exhaust nozzle of claim 7, wherein the plurality of plunger segments are located at a predetermined space between each other based on a placement of the plurality of flexures coupled thereto.

10. The exhaust nozzle of claim 7, wherein a material of the plurality of flexures is comprised of at least one of a metallic material and a ceramic material; and wherein a material of the plurality of plunger segments is comprised of at least one of a metallic material and a ceramic material.

11. The exhaust nozzle of claim 7, wherein the second plunger segment is further coupled to a third plunger segment using another one of the plurality of flexures.

12. The exhaust nozzle of claim 7, wherein the plurality of plunger segments comprise at least one of a plurality of machined plunger segments, plurality of stamped plunger segments, plurality of casted plunger segments, and plurality of additively manufactured plunger segments.

13. A method of sealing a gap, the method comprising:
    positioning a plunger seal apparatus within the gap and against a movable surface, the plunger seal apparatus having a plurality of plunger segments interconnected using a plurality of flexures, at least one of the plurality of flexures including a head coupled to a first segment of the plurality of plunger segments and two stems coupled to an inner surface of a second segment of the plurality of plunger segments such that the head is configured to rotate about a pivot point that is external to the second segment; and
    sealing the gap by allowing rotation of the at least one of the plurality of flexures about the pivot point, such that the plunger seal apparatus contours against at least a portion of the movable surface when moving.

14. The method of claim 13, further comprising defining a predetermined space between each of the plurality of plunger segments using the plurality of flexures.

15. The method of claim 14, wherein the predetermined space is substantially uniform between each of the plurality of plunger segments.

16. The method of claim 13, wherein the plurality of flexures are coupled to the inner surface of the plurality of plunger segments using at least one of bonding, soldering, welding, braising, and adhesive methods.

17. The method of claim 13, wherein the plurality of plunger segments are fabricated using at least one of a machining process, a stamping process, a casting process, and an additive manufacturing process.

18. The method of claim 13, wherein the plunger seal apparatus is configured to operate in temperatures between 500 and 2000 degrees Fahrenheit.

* * * * *

UNITED STATES PATENT AND TRADEMARK OFFICE
CERTIFICATE OF CORRECTION

| | | |
|---|---|---|
| PATENT NO. | : 11,692,510 B2 | |
| APPLICATION NO. | : 17/407439 | |
| DATED | : July 4, 2023 | |
| INVENTOR(S) | : James Shealy | |

It is certified that error appears in the above-identified patent and that said Letters Patent is hereby corrected as shown below:

In the Drawings

Please replace Fig. 1 with Fig. 1 as shown on the attached page.

In the Claims

In Column 12, Claim 7, Line 1, delete "adjacent the" and insert -- adjacent to the --, therefor.

Signed and Sealed this
Twelfth Day of September, 2023

*Katherine Kelly Vidal*

Katherine Kelly Vidal
*Director of the United States Patent and Trademark Office*